United States Patent [19]

Olsen

[11] Patent Number: 5,038,061
[45] Date of Patent: Aug. 6, 1991

[54] LINEAR ACTUATOR/MOTOR

[76] Inventor: John H. Olsen, 13502 SW. 186th St., Vashon Island, Wash. 98070

[21] Appl. No.: 528,857

[22] Filed: May 25, 1990

[51] Int. Cl.[5] .................. H02K 33/10; H02K 35/04
[52] U.S. Cl. .................................. 310/15; 310/27; 318/135
[58] Field of Search ............... 310/15, 27, 12, 13, 310/14, 37; 318/135

[56] References Cited

U.S. PATENT DOCUMENTS

| 520,810 | 6/1894 | Thomson | 310/15 |
|---|---|---|---|
| 1,785,643 | 12/1930 | Noack et al. | 310/15 |
| 2,328,337 | 7/1941 | Hanchock | 310/27 |
| 2,899,567 | 8/1959 | Romano | 307/81 |
| 2,959,747 | 11/1960 | Challacombe et al. | 331/156 |
| 2,992,342 | 7/1961 | Schmidt et al. | 310/15 |
| 3,102,205 | 8/1963 | Combs | 310/15 |
| 3,105,153 | 9/1963 | James, Jr. | 290/1 |
| 3,337,760 | 8/1967 | Allport | 310/15 |
| 3,398,302 | 8/1968 | Harnau et al. | 310/15 |
| 3,536,941 | 10/1970 | Tourtellotte | 310/27 |
| 4,235,153 | 11/1980 | Rinde et al. | 91/1 |
| 4,315,197 | 2/1982 | Studer | 318/135 |
| 4,433,279 | 2/1984 | Bhate | 322/3 |
| 4,454,426 | 6/1984 | Benson | 290/1 R |
| 4,529,906 | 7/1985 | McMahon | 310/13 |
| 4,602,174 | 7/1986 | Redlich | 310/15 |
| 4,623,808 | 11/1986 | Beale et al. | 310/15 |
| 4,642,547 | 2/1987 | Redlich | 322/3 |
| 4,649,283 | 3/1987 | Berchowitz et al. | 290/1 R |
| 4,827,163 | 5/1989 | Bhate et al. | 310/15 |
| 4,937,481 | 6/1990 | Vitale | 310/15 |

Primary Examiner—Steven L. Stephan
Assistant Examiner—Dennis Haszko
Attorney, Agent, or Firm—Hughes & Multer

[57] ABSTRACT

A linear alternator/motor which is capable of translating the energy of linear mechanical motion into electrical energy, and/or also transforming electrical energy into linear mechanical motion. There is an inner pole member and an outer circumferential pole member defining first and second annular gaps. An armature component comprising first and second coil sections, positioned in the gaps, reciprocates relative to the the pole members. The coil sections have current flowing therein so that field portions of these coils coupled into the main magnetic field substantially cancel each other as the coil selections move between end positions.

18 Claims, 2 Drawing Sheets

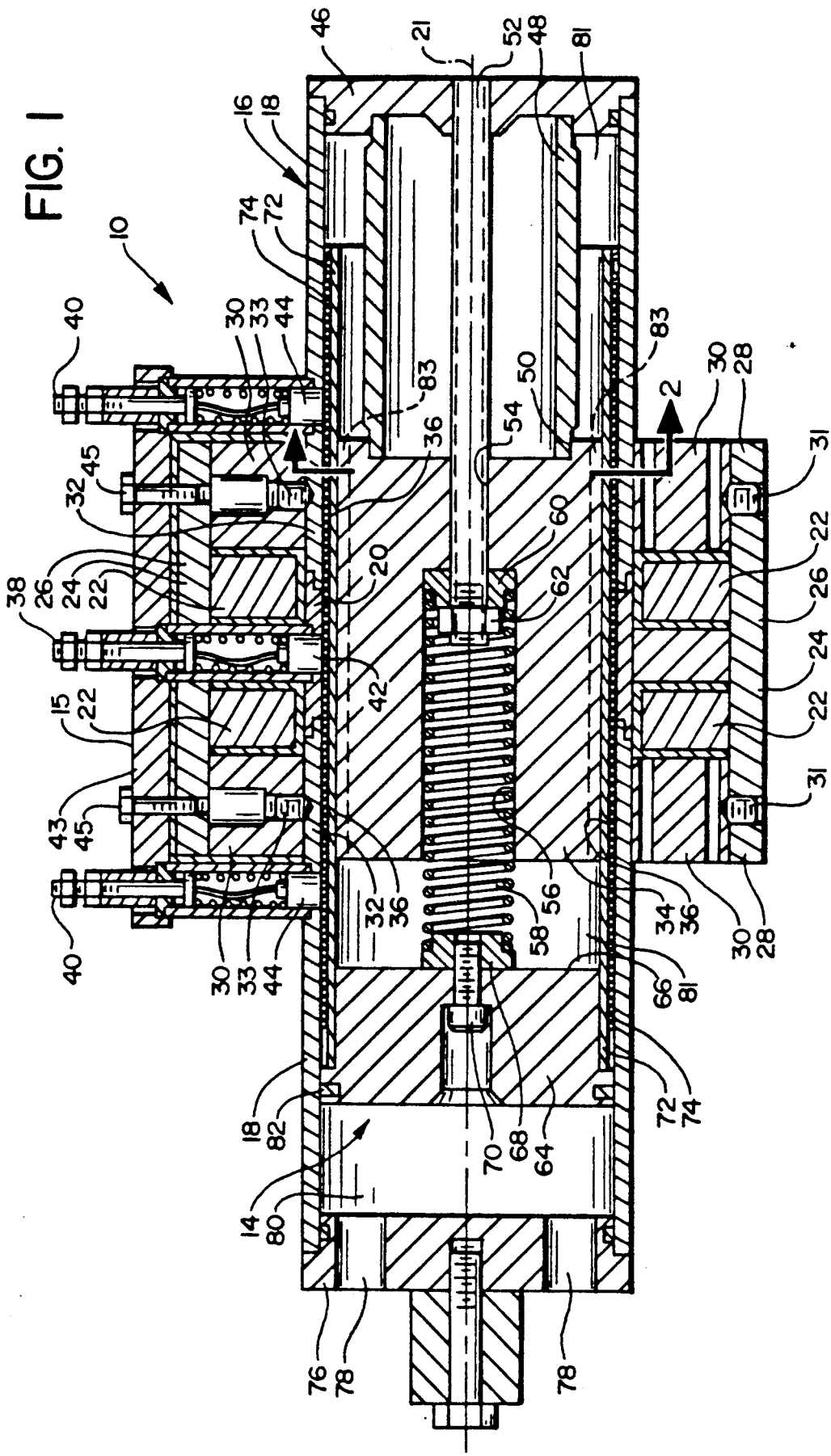

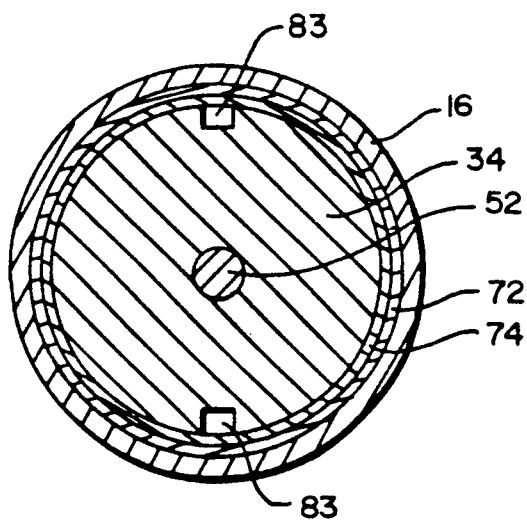
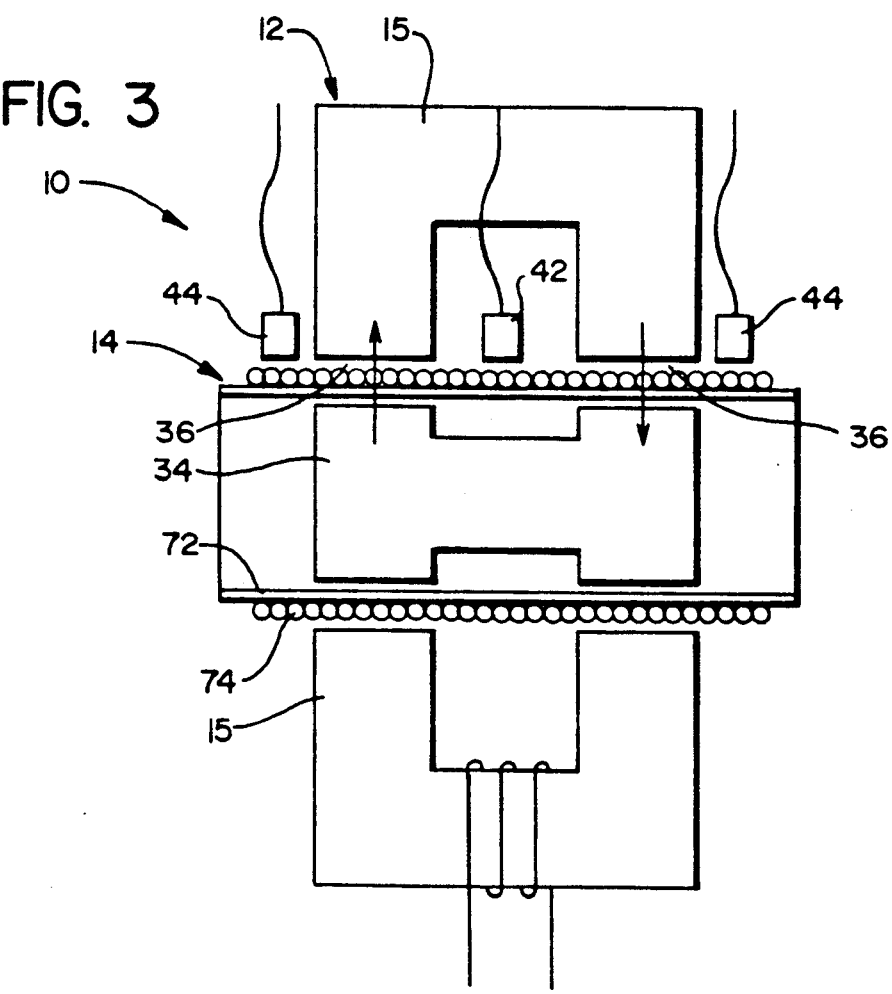

LINEAR ACTUATOR/MOTOR

BACKGROUND OF THE INVENTION

A. Field of the Invention

The present invention relates to a linear alternator/motor, and more particularly to such an apparatus which can operate in a mode to translate mechanical energy provided in the form of a reciprocating motion to electrical energy, and also which can be used to transform electrical energy into mechanical energy having a reciprocating motion.

Background Art

There are in the prior art various devices where reciprocating mechanical motion can be transformed into electrical energy and/or the electrical energy can be transformed into mechanical energy where the mechanical output is a reciprocating motion. These devices may be divided into 2 types:

(a) those where a magnetic field source moves with the reciprocation motion and induces a fluctuating magnetic field into a magnetic circuit and power is taken from coils linking the fluctuating magnetic flux; and (b) those where the field source is stationary and wires are reciprocated in a gap in the magnetic circuit (Loudspeakers are examples of linear motors using this principle).

This invention is concerned with devices of the second type. If a single coil is placed in a single gap as is commonly done with loudspeaker actuators, the alternating current in the coil produces a magnetic field that alternately weakens and strengthens the field. This fluctuating field has three harmful effects on the performance and cost of the device. First, the energy stored and released by the field is the cause of a large inductance of the coil which limits the current to or from the coil. In some devices this inductance is balanced with a tuning capacitor at increased cost. Second, the fluctuating field within the magnetic circuit core material causes eddy currents that dissipate energy. These are normally reduced by building the core with a relatively expensive laminated material. Third, a larger than necessary field is required so that it will still be sufficiently strong when weakened by the coil current. These problems have not been addressed properly in the prior art.

A search of the patent literature has disclosed a number of patents, these being the following:

U.S. Pat. No. 520,810 (Thomson) shows an electrical reciprocating motor where in FIG. 1 there is a magnetic field developed by the coils C and C'. The field extends through the outer casing 8 from one coil C to the other coil C' and then back through an air gap of substantial length extending through the area indicated at F. A set of coils T are mounted to a spider J which is in turn mounted to a reciprocating rod R, and an alternating current is applied to these coils T so that the current will develop a alternating magnetic field which will cause the coils T to move back and forth, and thus reciprocate the rod R.

In a second embodiment shown in FIG. 6, the central core D is made as a single core which is essentially an interior tube concentric with the tube H. The coil T reciprocates in the annular gap between the tubes D and H.

U.S. Pat. No. 2,899,567 (Turner) discloses a linear alternator with two gaps in the magnetic field, and with a piston member reciprocating in these gaps. In a first embodiment shown in FIG. 1, it appears that all of the coils are stationary, and the piston, made of a conductive material, moves relative to the coils. A further embodiment is shown in FIGS. 4 and 5, and at the bottom of column 10 beginning at line 65 and following, it is stated that the piston is replaced with a multi-turn piston winding so that the current is introduced directly into the moving turns. In column 11, beginning at line 3, it is stated that one half of each piston winding is clockwise and the other half counterclockwise as respective halves of the winding vibrate in magnetic fields which are opposite in radial direction. Further, in column 12, beginning on line 14, it is stated that the coil section 144 has a copper wire wound counterclockwise on one half and counterclockwise on the other half with the two halves being joined together at the center. The outer ends of the coil sections are suitably mounted and secured mechanically and electrically in the end mass sections 142 and 143. The reasons for such proposed arrangements are not disclosed, and the proposed construction is not totally clear to the applicant. It is possible in some arrangements that in certain positions there could be some cancellation of magnetic fields created by the coils, but it is believed that with an embodiment that could be reasonably contemplated from this description, any cancellation would not be balanced and would vary in magnitude during a cycle.

U.S. Pat. No. 2,959,747 (Challacomb et al) shows what is called an "electro motor vibrator and oscillator systems", where a pair of electrical coils 37 and 38 are mounted to a spring 35 within a magnetized cylindrical jacket 10. By imparting a current of a certain frequency to the coils, these are caused to oscillate. In FIG. 5 there is shown an arrangement where there is a single coil mounted to this frame.

U.S. Pat. No. 3,105,153 (James, Jr.) shows a device to generate electric current where there is a piston, mounted in a cylinder, with the piston having a pair of permanent magnets 24 and 26. Electric coils are mounted around the periphery, and fuel is injected alternately into upper and lower chambers and ignited to cause the oscillating action of the piston.

U.S. Pat. No. 4,433,279 (Bhate) discloses a system Stirling engine drives an oscillating alternator. There is an alternator plunger 54 which reciprocates in a bore 56. There are two pairs of pole faces which are aligned at the plunger midstroke. The axial reciprocation of the plunger 54 causes the pole faces 60 to alternately link the flux of the field coil 46 around first the to and then the bottom AC coil 50 so that the flux alternates between zero and maximum once every cycle of the alternating plunger 54 to induce an alternating voltage in the coils 50.

U.S. Pat. No. 4,454,426 (Benson) discloses a linear electro magnetic machine which has a starter with a coil mounted thereon. There is a reciprocating element with permanent magnet segments of alternating polarity. The movement of the reciprocating element induces an alternating voltage through the coil.

U.S. Pat. No. 4,602,174 (Redlich) discloses a linear alternator apparatus where a high permeability material is formed into a flux loop having at least a pair of spaced gaps formed transversely through the loops. There is a reciprocating magnet which reciprocates between alternate positions between the gaps.

U.S. Pat. No. 4,642,547 (Redlich) discloses a control circuit for a linear actuator that uses an adjustable resister to keep the load on the alternator constant by dumping unwanted power into the resistor.

U.S. Pat. No. 4,649,283 (Berchowitz) discloses a linear alternator that produces multi-phase power by using multiple masses coupled by springs with magnets on each moving mass.

U.S Pat. No. 4,623,808 (Beale et al) discloses a device quite similar to U.S. Pat. No. 4,649,283 discussed immediately above.

SUMMARY OF THE INVENTION

The present invention relates to a linear alternator/motor which is capable of translating the energy of linear mechanical motion into electrical energy, and/or also transforming electrical energy into linear mechanical motion. The preferred form of the invention is to eliminate the need of a tuning capacitor or a laminated construction.

The apparatus comprises pole means having an axis and providing a main magnetic circuit which extends across first and second spaced gaps in opposite first and second directions, respectively. There is an armature means comprising first and second coil section means positioned in said first and second gaps. The armature means is mounted for reciprocating motion relative to the pole means in a manner that the first and second coil section means move back and forth between end positions through magnetic lines extending across said first and second gaps.

The first and second coil section means are arranged so that magnetic fields generated by current flowing in said first and second coil section means are coupled into the main magnetic circuit to a generally equal extent. Current flow through the first and second coil section means is in opposite directions so that portions of the fields caused by these currents substantially cancel in the main magnetic circuit.

Other features will become apparent from the following detailed description.

BRIEF DESCRIPTION OF THE DRAWINGS

FIG. 1 is a sectional view of an embodiment of the present invention, taken along the longitudinal center line thereof;

FIG. 2 a sectional view taken along line 2—2 of FIG. 1.

FIG. 3 is a somewhat schematic view, similar to FIG. 1, to illustrate the operating principle of the present invention.

DESCRIPTION OF THE PREFERRED EMBODIMENTS

With reference to FIG. 1, which shows a first embodiment of the present invention, the apparatus 10 of the present invention comprises a stationary pole component 12 which provides a magnetic field, and a moveable armature component 14 which reciprocates in that magnetic field. As indicated previously, the apparatus 10 can function in two modes. First, mechanical energy can be applied to the apparatus 10 to cause reciprocation of the armature component 14 so as to produce an electrical output. In a second mode, electrical energy can be applied to the armature component 14 to cause reciprocation of the armature component 14, with the output thus being reciprocating mechanical movement.

The pole component 12 comprises an outer pole piece 15 comprising a cylindrical housing 16 which is made up of two end sections 18 made of a magnetic material, such as mild steel, and a central section 20 made of a nonmagnetic material, such as a 300 series stainless steel. Extending circumferentially around the middle portion of the cylindrical housing 16 are two field coils 22 which are energized by DC current to create the magnetic field.

For purposes of description, the apparatus 12 will be considered as having a longitudinal center axis 21. The term "radially inward" will denote proximity to this center axis 21, with the term "radially outward" denoting the opposite. The term "axially inward" will denote location along the axis 21 which is closer to a central location, while the term "axially outward" denotes the opposite. The terms "right" and "left" will be used to denote location relative to the portions of the apparatus 10 which appear at right and left hand locations as viewed in FIG. 1.

The outer pole piece 15 further comprises an outer cylindrical member 24 which has middle portion 26 that is positioned around and immediately adjacent to the coil 22, and two end portions 28 which extend beyond the middle portion 26. There are two annular end plates 30 which are positioned axially outwardly of the two coils 22 so as to be on opposite side of the coils 22, and are positioned immediately adjacent to and radially inwardly of the outer portions 28 of the cylindrical member 24. Positioning screws 31 are provided to hold the plate 24 in proper position relative to the annular end plates 30. The magnetic circuit then extends through adjacent axially inward portions 32 of the sections 18 of the housing 16.

To complete the magnetic circuit, there is provided an inner cylindrical pole piece 34 made of a magnetic material. There are two small annular spaces 36 which surround the pole piece 34 and which provide the gap 36 across which the lines of flux of the magnetic field extend.

When the two field coils 22 are energized, the circuit of the magnetic field caused by the coils 22 goes through the cylindrical member 24 through one of the annular end plates 30, across one of the gaps 36 into the pole piece 34, and then from the pole piece 34 through a second gap 36 thence back to the other end plate 30, back to the outer cylindrical member 24. Thus, it will be noted that there are two axially spaced gaps 36, where the lines of flux extend in opposite radial direction. This arrangement is believed to be a significant feature of the present invention which in the overall apparatus provides certain benefits, which will be explained later herein.

Mounted near and through the outer cylindrical member 24 are three electrical terminals, mainly a center terminal 38 and two end terminals 40. At the radially inward ends of these terminals 38, there is a middle contact brush 42 for the middle terminal 38 and two end contact brushes 44, one for each of the end terminals 40. These terminals 38 and 40 along with their brushes 42 and 44 are, or may be of conventional design. A mounting plate 43 is provided for the terminals 38 and 40, and retaining screws 45 are provided to retain the mounting plate 43 in position against the outer tubular member 26. Retaining screws 33 are provided to hold the annular end plates 30 in position around the end housing portions 18.

To provide a mounting for the central pole piece 30, there is at the right end of the housing 18 a mounting plate 46 to which is connected a mounting collar 48 which extends axially inwardly to connect to the pole piece 34 at a connecting location indicated at 50. Also, there is a bolt member 52 which extends in an axially inward direction from the plate 46 to extend through a center opening 54 in the righthand end of the pole piece 34. The pole piece 34 is also formed with a center cylindrical recess 56 to receive a coil spring 58. There is a mounting collar 60 retained by a nut 62 on the left end of the bolt 52, and the righthand end of the spring 58 bears against this mounting collar 60.

As will be disclosed more completely hereinafter, this spring 58 provides a restoring force to return the armature component 14 to the center of its stroke.

To describe now the armature component 14, there is a piston 64 which is mounted for reciprocating motion in the lefthand portion of the cylindrical housing 16. On its righthand surface 66 the piston has mounted thereto a bearing member 68 retained by a bolt 70. The aforementioned spring 58 bears against this collar 68.

Fixedly connected to and extending to the right from the periphery of the piston 64 is a mounting sleeve or piston 72 made from an electrically insulating material. A coil 74 is wound around the outer surface of the sleeve 72 so as to extend substantially along the entire length of the sleeve 72, this coil 74 being wound in the same direction in a helical pattern. This coil 74 is positioned so that it makes electrical contact with all Three of the brushes 42 and 44 during the entire motion of armature component 14. The piston 64 and its sleeve 72 are arranged so that these reciprocate along the axis 21.

The lefthand end of the housing 18 has an end plate 76 having a pair of ports 78 which lead into a chamber 80 which is defined by the aforementioned piston 64 and the end plate 76. When the apparatus 10 is functioning as an alternator (i.e. to translate reciprocating mechanical energy into electric current), a gaseous fluid can be pumped alternately into the chamber 80 and exhausted therefrom. On the high pressure stroke, when the gaseous fluid is pumped into the chamber 80, the piston 64 is moved to the right. The air in the chamber 81 defined by the piston 64 and the end wall 46 is compressed. This chamber 81 has right and left portions interconnected by longitudinal slots 83 formed in the outer surface of the core 34. As the gaseous fluid is permitted to be discharged from the chamber 80, the air in the chamber 81 moves the piston 64 to the left. The spring 58 functions primarily as a centering spring. This alternating inflow and withdrawal of the gaseous fluid could be accomplished, for example, by a Stirling engine. A piston ring or seal is provided at 82 to prevent leakage of the gaseous fluid around the piston 64. An alternative arrangement would be to form a seal between the pole piece 34 and the sleeve 72 so that only the left hand portion of the chamber 81 between the piston 64 and the core 34 functions as the air compression chamber. In this instance seal 82 and the slots 83 would be eliminated.

It is readily apparent that as gaseous fluid is pumped into and withdrawn from the chamber 80 so as to reciprocate the piston 64 and its sleeve 72, the passage of the coil 74 through the two gaps 36 in the magnetic field will cause a voltage to be generated in the coil 74 at the location of the two gaps 36 which are in turn adjacent to the two end plates 30. Also, since the coil 74 is wound in the same direction, and since the directions of the magnetic field at the two gaps 36 are opposite in direction, the voltage which is imposed on the two portions of the coil passing through the gap 36 will be opposite. The brush 42 is located between the two gaps, while the two brushes 44 are located axially outwardly of the two gaps 36. Thus, it is apparent that the voltages which are generated in the two portions of the coil 74 will cause a current from the two end terminals 40 through the coil portion in the gaps 36 and thence into the middle terminal 38. Further, when the coil 74 moves in the opposite direction, the direction of current will change so that it flows from the center terminal 38 through the two coil portions and into the two end terminals 40.

To describe the operation of the present invention, reference is made to FIG. 3 which is a simplified drawing of the apparatus shown in FIGS. 1 and 2.

There is a magnetic circuit provided by the outer pole piece 15 and the inner pole piece 34. The outer pole piece 15 has windings which produce a radially inward magnetic field at the right-hand end (as shown in FIGS. 1 and 3) and a radially outward field at the left-hand end. The pole pieces 15 and 34 provide the two gaps 36. The piston or tube 64 and the coil 74 wound thereon reciprocate as a unit relative to the pole pieces 15 and 34. The middle brush 42 is placed midway between the two gaps 36 in the field and the two end brushes 44 are at each end of the magnetic circuit. As the coil 74 and its piston moves rightward, a voltage is induced between the center brush 42 and the right-hand brush 44 by the magnetic field in the right-hand gap 36 according to the well known laws of induction. The same voltage is induced between the center brush 42 and the left-hand brush 44 because the magnetic field is in the reverse direction in the left-hand gap 36.

The left and right hand brushes 44 are then connected together electrically and useful current may be drawn between that connection and the center brush 42. In this case the device serves as a linear generator. If the coil 74 is caused to reciprocate at say 60 Hz, the device delivers 60 Hz alternating current. Alternatively, if current is applied to the connections, the coil 74 and the piston 64 can be driven as a linear motor by the force developed by the current flowing through the wires in the gaps 36.

A particularly useful and novel feature of this geometry is that the current from the center brush 42 flows in opposite directions around the circumference of the coil 74 as it flows to the left and right-hand brushes 44. The result is that no net magnetic field in the main magnetic circuit is produced by the current through the circuit. The current does not tend to weaken or strengthen the magnetic field in the magnetic circuit. Moreover, if the coil current is fluctuating as in an alternating current device, it induces no fluctuating magnetic field in the magnetic circuit so that expensive laminated core materials are not necessary. These features have been confirmed by measurements in a prototype apparatus. They can be achieved by building a device that is more or less symmetric about the center brush 42 and adjusting the position of the central pole piece 34 along the axis to achieve a near perfect magnetic circuit balance.

Yet another advantage that can be achieved is low inductance of the power circuit through the brushes. This feature is somewhat independent of the considerations above in that it requires that the two halves of the power coil be not only symmetric with respect to the main magnetic circuit, but that they be coupled strongly to each other either through the main magnetic circuit or by other means. Another means of stating this requirement is that the mutual inductance between the two halves of the power coil 74 must be high compared to the self inductance of each half separately. In the particular prototype tested, the mutual inductance was about ten percent of the self inductance so that the two halves of the coils behaved almost as independent coils. However, since the coils were not strongly coupled to the main magnetic circuit, their inductive impedance was still only a fraction of their resistance.

It can also be seen that in the preferred embodiment of the present invention, with the coil 74 being wound symmetrically and uniformly along the length of the piston 64, the right and left portions of the coil 74 that are in the gaps 36 have the same number of windings positioned within the gaps 36 at any one time. Further, with the distance between the middle brush to the two end brushes 44 being the same, the number of windings positioned between the center brush 32 and the right brush 44 and between the center brush 32 and the left brush 44 are of the same number. Thus, throughout the entire stroke of the piston 64 and the coil 74, the inductance generated by the right and left coil sections that are carrying current are substantially equal and thus substantially cancel each other out.

It is also apparent that other modifications could be made. For example, the magnetic field could be provided by permanent magnets, rather than by the coils 22. Further, the coils 32 could be mounted on the pole piece 34, in which case the cylindrical housing 16 could serve the function of the outer cylindrical member 24 in forming the magnetic circuit (in which case the center section 20 would be made of a magnetic material).

By minimizing the inductive reactance, it would be possible to avoid the need of compensating capacitors. Further, if the apparatus 10 is operated at a resonant frequency, higher efficiencies could be obtained.

It will be noted that by forming the housing section 16 with the non-magnetic middle portion 20, this permits placing the magnetic field sources outside of the housing 16, as shown in this preferred configuration.

It is obvious that various modifications could be made to the present invention without departing from the basic teachings thereof.

What is claimed is:

1. An apparatus to function as at least one of an actuator or a generator, comprising:
   a. pole means providing a first main magnetic field which extends across first and second spaced gaps in opposite first and second directions, respectively;
   b. armature means comprising coil means having first and second coil section means positioned in said first and second gaps, respectively, said armature means being mounted for reciprocating motion relative to said pole means in a manner that said first and second coil section means move back and forth between end positions through magnetic field portions extending across said first and second gaps, with said first and second coil section means generating second and third secondary magnetic fields, respectively, which are at least partially coupled in the main magnetic field;
   c. said pole means being arranged in a manner that the second field generated by said first coil section means in said first gap interacts with the third field created by said second coil section means in said second gap so that field portions of said second and third fields coupled into the main field substantially cancel each other as said first and second coil section means move between said end positions.

2. The apparatus as recited in claim 1, wherein said first and second coil section means comprises a continuously wound coil.

3. The apparatus as recited in claim 2, wherein said first and second coil section means are wound in the same direction.

4. The apparatus as recited in claim 3, wherein there is a first central brush means connected electrically to said coil means at a location between said first and second coil section means, and two end brush means positioned on opposite sides of said first brush means and electrically connected to said first and second coil section means, respectively, in a manner that current flows from each of said end brush means through said first and second coil section means to said central brush means.

5. The apparatus as recited in claim 4, wherein said first and second coil section means are arranged in a manner that windings of said first and second coil section means which are positioned in said first and second gaps, respectively, cause substantially equal portions of flux from each coil section means to be linked into a main magnetic circuit of said pole means.

6. The apparatus as recited in claim 5, wherein said central brush means is spaced from said end brush means in a manner that the number of windings in said first and second coil section means extending between said central brush means and said end brush means are substantially equal, whereby magnetic fields created by said first and second coil section means are substantially equal and cancelling.

7. The apparatus as recited in claim 1, wherein said first and second coil section means are arranged in a manner that windings of said first and second coil section means which are positioned in said first and second gaps, respectively, cause substantially equal portions of flux from each coil section means to be linked into a main magnetic circuit of said pole means.

8. The apparatus as recited in claim 7, wherein there is a first central brush means connected electrically to said coil means at a location between said first and second coil section means, and two end brush means positioned on opposite sides of said first brush means and electrically connected to said first and second coil section means, respectively, in a manner that current flows from each of said end brush means through said first and second coil section means to said central brush means.

9. An apparatus to function as at least one of an actuator or a generator, comprising:
   a. a pole means having a longitudinal center axis and comprising a first inner pole member extending along said axis, and an outer pole member, positioned radially outwardly of, and extending around, said inner pole member in a manner to form first and second annular gaps between said inner and outer pole members, with said pole means providing a first main magnetic field which is directed radially inwardly at said first gap and radially outwardly at said second gap;
   b. an armature means comprising coil means having at least first and second coil section means positioned in said first and second gaps, respectively, said armature means being mounted for reciprocating motion relative to said pole means in a manner that said first and second coil section means have current flowing oppositely therein so as to create opposing second and third secondary magnetic fields;

c. windings of said first and second coil section means being arranged relative to said gaps in a manner that the second and third fields created by said first and second coil section means interact so that field portions of said second and third fields coupled into said main magnetic field substantially cancel one another;

d. electrical power connection means operatively connected to said first and second coil section means by a central connection at a central location between said first and second coil section means and also at end connections positioned axially outwardly of said first and second coil section means.

10. The apparatus as recited in claim 9, wherein said first and second field portions are coupled in said main magnetic field.

11. The apparatus as recited in claim 10, wherein said coil means is a substantially continuous coil wound in the same direction through said first and second coil section means.

12. The apparatus as recited in claim 11, wherein said coil is a continuously and uniformly wound coil.

13. The apparatus as recited in claim 12, wherein said central connection comprises central brush means centrally located between said first and second coil section means, and said end connections comprise end brush means.

14. The apparatus as recited in claim 9, further comprising spring means urging said armature means toward a central position.

15. The apparatus as recited in claim 9, wherein said apparatus comprises means to confine a closed air chamber which expands and contracts in volume as said armature means reciprocates, thus tending to restore said armature means toward a central position.

16. The apparatus as recited in claim 9, wherein at least one of said pole members is adjustably positioned along said axis in a manner that balancing of said first and second field components can be properly accomplished.

17. The apparatus as recited in claim 9, wherein said apparatus further comprises tubular housing means surrounding said coil means, said housing means comprising first and second end portions made of a magnetically conductive material, and a central portion made of a nonmagnetically conductive material.

18. The apparatus as recited in claim 17, wherein said tubular housing means defines an enclosed chamber which acts is capable of withstanding a pressurized gaseous substance within said tubular housing.

* * * * *